United States Patent
Ruppert

(10) Patent No.: US 7,389,641 B2
(45) Date of Patent: Jun. 24, 2008

(54) SYSTEM FOR AND METHOD OF OPERATING A PRESSURIZED AIR SOURCE OF A VEHICULAR AGRICULTURAL APPLICATOR

(75) Inventor: Rex L. Ruppert, Benson, MN (US)

(73) Assignee: CNH America LLC, New Holland, PA (US)

( * ) Notice: Subject to any disclaimer, the term of this patent is extended or adjusted under 35 U.S.C. 154(b) by 209 days.

(21) Appl. No.: 11/404,696

(22) Filed: Apr. 14, 2006

(65) Prior Publication Data

US 2007/0240414 A1    Oct. 18, 2007

(51) Int. Cl.
*F04B 49/00* (2006.01)
*A01C 15/04* (2006.01)

(52) U.S. Cl. .......................................... 60/431; 111/200
(58) Field of Classification Search ................... 60/431, 60/449; 111/200, 921
See application file for complete search history.

(56) References Cited

U.S. PATENT DOCUMENTS

| | | | |
|---|---|---|---|
| 4,523,892 A * | 6/1985 | Mitchell et al. | 60/431 |
| 4,562,968 A * | 1/1986 | Widmer et al. | 111/175 |
| 5,485,962 A * | 1/1996 | Moss | 239/655 |
| 6,145,455 A * | 11/2000 | Gust et al. | 111/921 |
| 6,182,588 B1 * | 2/2001 | Bodie et al. | 111/921 |

OTHER PUBLICATIONS

Saur Sundstrand Product Literature, At least Mar. 28, 2006, pp. 13 and 60.
Saur DanFoss Product Literature, May 1996, pp. 10-11 and 37.

* cited by examiner

*Primary Examiner*—Thomas E Lazo
(74) *Attorney, Agent, or Firm*—Rebecca Henkel

(57) ABSTRACT

A system configured to drive a fan of an agricultural applicator is provided. The fan is mounted on a wheeled chassis assembly propelled via a drive train by an engine in a forward direction of travel. The system includes a hydraulic pump mechanically driven by the engine. The hydraulic pump is connected to drive the fan in creating a pressurized air stream to distribute product from the applicator across a field. The system further includes a stroke limiter mechanically connected to the hydraulic pump. When the engine slows below a threshold speed, the stroke limiter automatically diverts a portion of a power demand by the hydraulic pump via the drive train to drive movement of the wheeled chassis assembly.

11 Claims, 2 Drawing Sheets

SYSTEM FOR AND METHOD OF OPERATING A PRESSURIZED AIR SOURCE OF A VEHICULAR AGRICULTURAL APPLICATOR

RELATED APPLICATIONS

Not applicable.

BACKGROUND OF THE INVENTION

1. Field of the Invention

The invention relates to a vehicular agricultural applicator and, more particularly, relates to a system for a method of transferring power from a pressurized air source to drive a chassis assembly of the agricultural applicator turning from a linear, forward direction of travel.

2. Discussion of the Related Art

Various agricultural applicators have been employed to deliver product (e.g., seed, fertilizer, herbicides, etc.) to agricultural fields. As the size of agricultural applicators continues to grow, the versatility of such applicators becomes more significant.

Agricultural applicators can be of various designs to dispense seeds, fertilizer, and herbicides at a controlled rate to an agricultural field. In a conventional arrangement, a motorized wheeled chassis assembly supports a product hopper or bulk storage tank configured for containing and carrying a large quantity of product to be distributed across an agricultural field. The many different types of product to be distributed may vary considerably in size, weight and shape.

A wide variety of agricultural applicators are generally available, depending on the type and the form of the product being distributed. A certain known agricultural applicator is an air pressure differential-type. One type of air pressure differential type applicator is a positive-pressure type.

The positive-pressure type applicator generally includes a pressure source that creates a forced air stream configured to convey product fed or delivered from a bulk storage tank or hopper for distribution in the field. The bulk storage tanks allow a farmer to plant more acreage before having to stop to fill the bulk storage tanks again, resulting in quicker planting and less labor while maintaining the precision spacing available by on-row singulation. A blower typically provides the forced air stream along a path to agitate and entrain the product from the bulk storage tanks.

The blowers on these agricultural applicators typically pull a large power demand or horsepower (e.g., 93 hp on a 3-inch diameter distribution line, 68 hp on a 2.5-inch diameter distribution line). When the applicator comes to an end of the field and readys to turn, the engine of the applicator slows down because of the increased resistance at the drive wheels associated with turning the applicator. However, the blower continues to operate at full flow so that entrained product does not drop of the pressurized air stream which leads to increased opportunities for plugging. The blower is typically configured to operate at full flow down to the lower engine speed (e.g., 1500 rpm) associated with driving the chassis assembly of the applicator around a corner. To keep the blower at full flow, a hydraulic drive or pump connected to drive the blower is configured at an engine speed of 1500 rpm to de-stroke the swash plate from a maximum oil flow rate correlated to a maximum blower speed.

These certain known planting implements as described above have drawbacks. The hydraulic pump and connected blower draw full horsepower an engine speed of 1500 rpm or higher. This large horsepower draw by the hydraulic pump bogs down or inhibits the engine's ability to increase in speed as the applicator comes out of the turn or corner, especially with smaller horsepower engines.

Accordingly, there is a need for an vehicular agricultural applicator having a system configured to transfer a power demand by a pressurized air source to a chassis assembly of the applicator as the applicator corners or turns from a linear and forward direction of travel at an end of the field.

SUMMARY OF THE INVENTION

The present invention provides a system that transfers power from a pressurized air source to drive a chassis assembly of a mobile vehicle turning from a linear, forward direction of travel.

In a first embodiment of the present invention, a system configured to drive a fan of an agricultural applicator is provided. The fan is mounted on a wheeled chassis assembly propelled via a drive train by an engine in a forward direction of travel. The system includes a hydraulic pump mechanically driven by the engine. The hydraulic pump is connected to drive the fan in creating a pressurized air stream to distribute product from the applicator across a field. The system further includes a stroke limiter mechanically connected to the hydraulic pump. When the engine slows to a threshold speed above a minimum speed to provide full fluid output to drive the fan, the stroke limiter automatically diverts a portion of a power demand by the hydraulic pump to the drive train so as to power movement of the wheeled chassis assembly.

The preferred stroke limiter mechanically limits a stroke of a hydraulic pump so as to limit a power demand by the pump to drive the fan. The stroke limiter automatically reduces the power demand of the pump at a threshold engine speed. The threshold engine speed is greater than a minimum engine speed to cause the fan to operate at a full speed. The preferred stroke limiter is configured to reduce the power demand of the pump at an engine speed of 1700 rpm, and the minimum engine speed is 1500 rpm to cause the fan to operate at a full speed. For example, this minimum engine speed of 1500 rpm can be reached when turning the applicator from the forward direction of travel. There is no adjustment of the full speed of the pump in driving the fan when the engine speed lowers to second speed reduced from a first engine speed in propelling the wheeled frame assembly over the ground in a forward direction of travel.

In another embodiment, the present invention provides an agricultural applicator that comprises a wheeled chassis assembly, an engine connected via a drive train to propel the wheeled chassis assembly over the ground, and a fan mounted on the wheeled chassis assembly and configured to create a forced air stream to convey a product to the field. The applicator further includes a system configured to drive the fan. The system includes a hydraulic pump mechanically driven by the engine and connected to drive the fan in creating the forced air stream. The system further includes a stroke limiter mechanically connected to the hydraulic pump. At a threshold engine speed, the stroke limiter is configured to automatically reduce at least a portion of the power demand of the pump and automatically divert to the drive train in moving the wheeled chassis assembly.

In accordance with yet another aspect of the invention, a method of driving a fan mounted on a motorized wheeled frame assembly is provided, substantially in accordance with the foregoing summary.

Other objects, features, and advantages of the invention will become apparent to those skilled in the art from the following detailed description and accompanying drawings.

It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
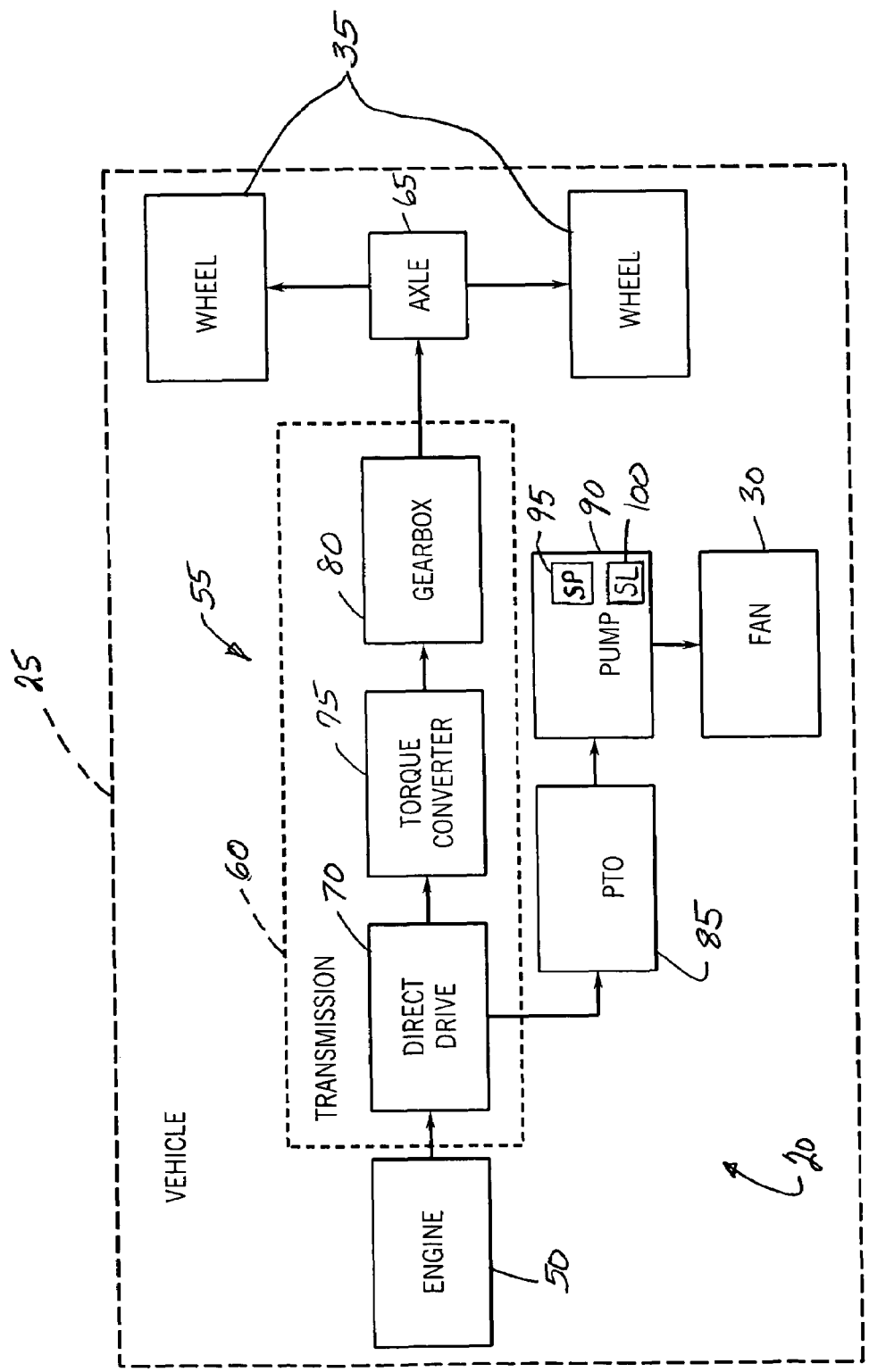
FIG. 1 illustrates a schematic diagram of a system of the present invention employed in combination with a vehicular agricultural applicator.
Figure 2:
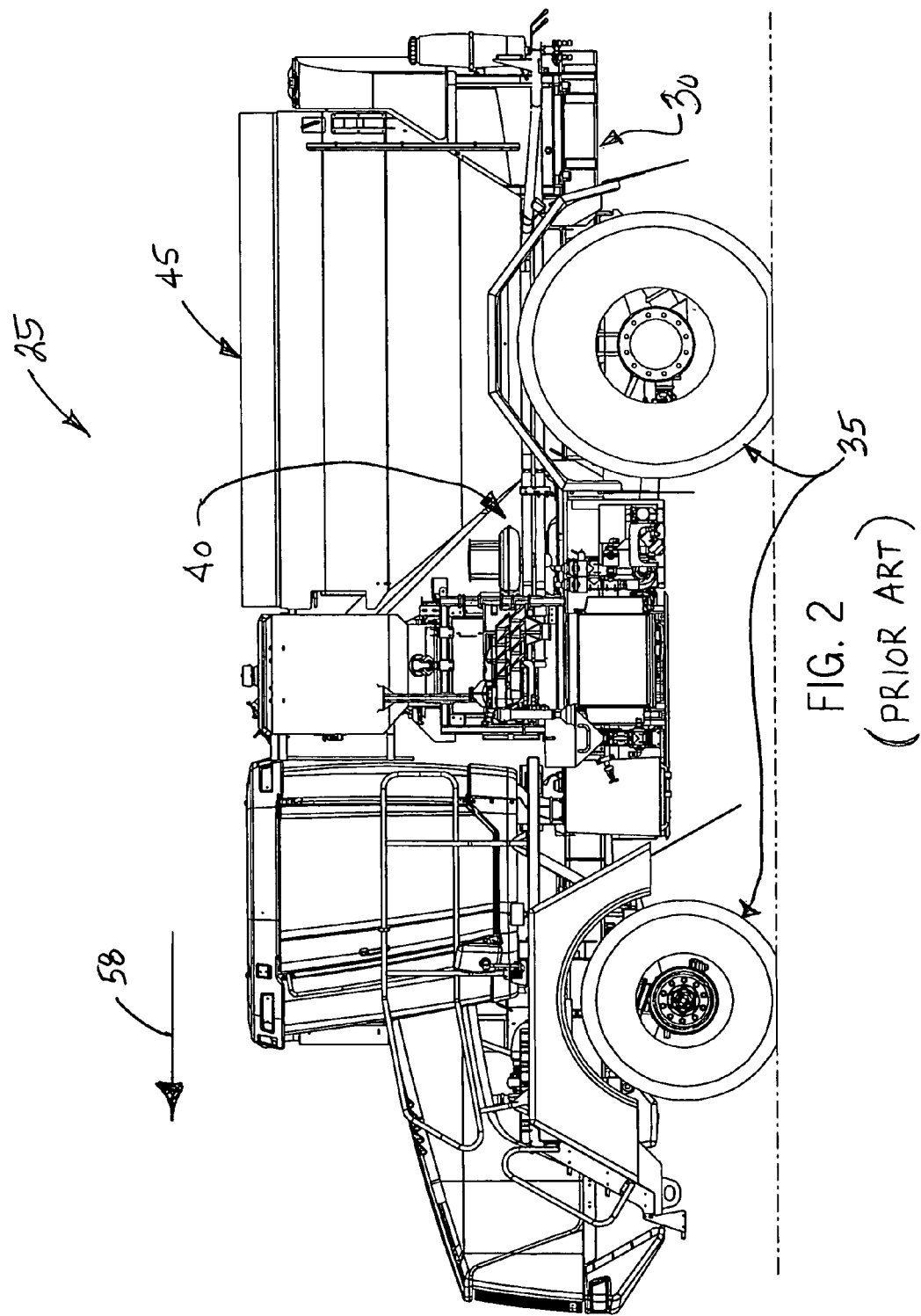
FIG. 2 illustrates a side elevation view of a known agricultural applicator.

FIG. 1 illustrates one embodiment of a system 20 of the present invention employed in combination with an agricultural vehicular applicator 25 (See FIG. 2) configured to provide a pressurized air stream operable to entrain a product for conveyance across a field. Referring to FIG. 2, the exemplary vehicular applicator 25 is a floater equipped with a chassis assembly 30 having over-sized wheel assemblies 35. Yet, the system 20 of the invention can be utilized on a wide variety of agricultural vehicular applicators 25 and is not limiting on the invention.

The exemplary agricultural vehicular applicator 25 generally includes a blower or fan 40 operable to create the forced air stream configured to convey product fed or delivered from a bulk storage tank 45 or hopper for distribution in the field. The bulk storage tank 45 allows a farmer to plant more acreage before having to stop to fill the bulk storage tank 45 again, resulting in quicker planting and less labor.

Referring now to FIG. 1, the system 20 of the invention is generally configured to both drive the wheeled chassis assembly 30 as well as hydraulically driven devices (e.g., fan 40) associated with operation of the applicator 25 in the field. The exemplary system 20 includes an engine 50 connected via a drive train 55 to drive movement of the wheeled chassis assembly 30 in a forward direction of travel (illustrated by arrow and reference 58). The exemplary drive train 55 includes a transmission 60 mechanically coupled to transmit power from the engine 50 to the axle 65 coupled to the oversized wheel assemblies 35. The transmission 60 includes a direct drive 70 mechanically coupled to receive power from the engine 50, and a torque converter 75 mechanically coupled to transfer power from the direct drive 70 to a gearbox 80. The gearbox 80 is mechanically coupled to transmit power to the axle 65 in driving movement of the wheel assemblies in mobile support of the vehicle 25.

As described above, the system 20 is also configured to provide power to hydraulic devices mounted on the vehicle 25 that are associated with pneumatic distribution of product across an agricultural field. A power take-off (PTO) unit 85 is mechanically driven by the engine 50 via the direct drive 70. The power take-off unit 85 is mechanically coupled between the direct drive 70 of the transmission 60 and a hydraulic pump or drive 90 connected to drive the fan 40. The exemplary hydraulic pump 90 is in fluid communication to drive the fan or blower 40. The hydraulic pump 90 is generally configured to communicate power from the engine 50 to drive the fan 40 so as to create a pressurized air stream or a vacuum stream operable to entrain and convey product for distribution across the agricultural field. A preferred hydraulic pump 90 is an axial piston variable displacement pump as manufactured by SAUER SUNDSTRAND®, series 90.

The hydraulic pump 90 is preferably a variable displacement pump that can be driven by the engine 50 to supply a selectively variable hydraulic flow to drive the fan 40. The hydraulic pump 90 includes a swash plate 95 having a variable angle which in a conventional manner reduces displacement of pistons (not shown) in driving a variable fluid output to drive the fan 40. The position of the swash plate 95 is varied based on an engine speed (e.g., rpm) of the engine 50. The swash plate 95 is configured at a maximum angle to provide a maximum fluid output at a minimum engine speed of the engine 50. The angle of the swash plate 95 is reduced with increasing engine speed above the minimum engine speed, thereby destroking the hydraulic pump 90 to maintain the same general fluid output.

The system 20 of the invention further includes a stroke limiter 100 mechanically coupled at the hydraulic pump 90. The stroke limiter 100 is configured to reduce the power demand the pump 90 by mechanically limiting the variable position of the swash plate 95, thereby reducing a maximum displacement of the pistons associated with driving fluid output to the fan 40.

Having described the general construction of the system 20, the following is a description of the operation of the system 20 in driving the fan 40 so as to create the forced air stream (positive or negative) to distribute product across the agricultural field.

For example, assume that the vehicular applicator 25 is driven by the engine 50 in forward and linear direction of travel (illustrated by arrow and reference 58). The hydraulic pump 90 and fan 40 draw full horsepower from the engine 50 at an engine speed of 1500 rpm or higher. The fan 40 typically pulls 93 horsepower on a 3-inch diameter distribution line, or 68 horsepower on a 2.5-inch diameter distribution line.

When the vehicular applicator 25 travels to an end of the field and readys to turn around, the speed of the engine 50 slows down with the increased resistance at the drive 3 wheels 35 associated with turning the vehicular applicator 25. However, the fan 40 is configured to continue operation at full speed so that air entrained product does not drop from the pressurized air stream. Allowing the product to drop from the air stream would increase opportunities for plugging of the distribution lines. The exemplary fan 40 is typically configured to operate at full speed down to a low or minimum engine speed (e.g., 1500 rpm) of the engine 50. This minimum engine speed of the engine 50 can occur with moving the wheeled chassis assembly 30 of the vehicular applicator 25 as it turns or corners from the forward and linear direction of travel 58. Above the low engine speed of the engine 50, the engine 50 drives the hydraulic pump 90 to as to provide a fluid output to drive the fan 40 at full speed to sustain the forced air stream.

As the operator steers the vehicular applicator 25 to corner or turn from the linear and forward direction of travel 58, such as at an end of the field, the system 20 of the invention automatically transfers the power demand by the hydraulic pump 90 to the drive train 55 in moving the wheeled chassis assembly 30 of the vehicular applicator 25. Thereby, additional power is communicated to support the increased power demand by the drive train 55 and wheeled chassis assembly 30 to speed up the vehicular applicator 25 coming out of the turn or corner and back to the linear and forward direction of travel 58. The stroke limiter 100 mechanically limits a stroke of the hydraulic pump 90, thereby limiting the power demand of the pump 90 to drive the fan 40. The stroke limiter 100 limits the power demand of the pump 90 at a predetermined threshold speed that is greater than the low or minimum engine speed of the engine 50 to drive the pump 90 to provide the fluid output to maintain the fan 40 at full speed.

For example, the preferred stroke limiter I 100 is configured to limit the power demand of the pump 90 at an engine speed of 1700 rpm, which is greater than the minimum engine speed of 1500 rpm experienced when the vehicular applicator 25 turns a corner. Thereby, the pump 90 is still operable to provide the fluid output to maintain full speed of the fan 40. A typical reduction in power demand of the pump 90 can range between 20 to 25 horsepower. Using the system 20 of the invention as described above, there is no remote or manual adjustment of the full speed of the hydraulic pump 90 or fan 40. The stroke limiter 100 operates automatically. Limiting the power demand of the pump 90 to drive the fan 40 reduces the power demand on the engine 50. This reduction in power demand on the engine 50 by the hydraulic pump 90 is automatically transferred or diverted to the drive train 55 so as to move the wheeled chassis assembly 30. This extra available power allows the engine 50 to increase a ground speed of the wheeled chassis assembly 30 coming out of the turn maneuver. In contrast, a conventional applicator would be bogged down by the large horsepower demand or draw by the hydraulic pump, inhibit the engine's ability to increase in speed as the applicator comes out of the turn or corner, especially with smaller horsepower engines.

Many changes and modifications could be made to the invention without departing from the spirit thereof. The scope of these changes will become apparent from the appended claims.

We claim:

1. A system configured to drive a fan of an agricultural vehicular applicator, the fan mounted on a wheeled chassis assembly propelled via a drive train by an engine in a forward direction of travel, comprising:
   a hydraulic pump mechanically driven by the engine, the hydraulic pump connected to drive the fan in creating a pressurized air stream; and
   a stroke limiter mechanically connected to the hydraulic pump, wherein:
   when the engine slows to a threshold speed, the stroke limiter diverts a portion of a power demand by the hydraulic pump via the drive train to drive the wheeled chassis assembly;
   the stroke limiter mechanically limits a stroke of the hydraulic pump so as to limit a fluid output to drive the fan;
   the stroke limiter restricts the fluid output of the pump above a predetermined engine speed driving the hydraulic pump; and
   the predetermined engine speed to restrict the fluid output of the pump is greater than a minimum engine speed to drive the pump at a full pump speed.

2. The system as recited in claim 1, wherein the stroke limiter is configured to destroke the pump at an engine speed of 1700 rpm, and the minimum engine speed is 1500 rpm to drive the pump at the full speed.

3. The system as recited in claim 2, wherein the minimum engine speed when turning from the forward direction of travel is 1500 rpm.

4. The system as recited in claim 2, wherein there is no manual adjustment of the full speed of the fan when the engine speed lowers to a second speed reduced from a first engine speed in propelling the wheeled frame assembly over the ground in the linear and forward direction of travel.

5. An agricultural vehicular applicator, comprising:
   a wheeled frame assembly;
   an engine connected via a drive train to propel the wheeled frame assembly over the ground;
   a fan mounted on the wheeled frame assembly and configured to create a forced air stream to convey a product to the field;
   a system configured to drive the fan, comprising a hydraulic pump mechanically driven by the engine, the hydraulic pump connected to drive the fan in creating the forced air stream;
   and a stroke limiter mechanically connected to the hydraulic pump, the stroke limiter configured to divert a portion of a power demand by the hydraulic pump to the drive train when slowing an engine speed in turning the wheeled frame assembly from a forward, linear direction of travel; wherein the stroke limiter restricts a fluid output of the hydraulic pump above a predetermined engine speed driving the hydraulic pump, the predetermined engine speed being greater than a minimum engine speed to drive the hydraulic pump at a full pump speed.

6. The agricultural vehicular applicator as recited in claim 5, wherein the stroke limiter mechanically limits a stroke of a hydraulic pump so as to limit a hydraulic flow to a hydraulic motor mechanically connected to drive the fan.

7. The agricultural vehicular applicator as recited in claim 6, wherein the stroke limiter is configured to destroke the pump at an engine speed of 1700 rpm, and the minimum engine speed is 1500 rpm to drive the pump at the full speed.

8. The agricultural vehicular applicator as recited in claim 7, wherein the minimum engine speed when turning from the forward direction of travel is 1500 rpm.

9. The agricultural vehicular applicator as recited in claim 7, wherein there is no adjustment of the full speed of the pump in driving the fan when the engine speed lowers to second speed reduced from a first engine speed in propelling the wheeled frame assembly over the ground in a forward direction of travel.

10. A method of driving a fan mounted on a motorized wheeled frame assembly, the method comprising the steps of:
    reducing at least a portion of a power demand by a pump connected to drive the fan mounted on the wheeled frame assembly, the step of reducing triggered when an engine speed of an engine that is connected to drive the pump slows below to a threshold speed above a minimum engine speed to drive a fluid output from the pump to drive the fan at a full speed;
    diverting the at least port of the power demand from the pump to a drive train in moving the wheeled frame assembly; and
    restricting a fluid output of the pump above a predetermined engine speed, the predetermined engine speed being greater than a minimum engine speed to drive the pump at a full pump speed.

11. The method as recited in claim 10, wherein the threshold speed occurs as the applicator turns from a linear and forward direction of travel.

* * * * *